2,353,185

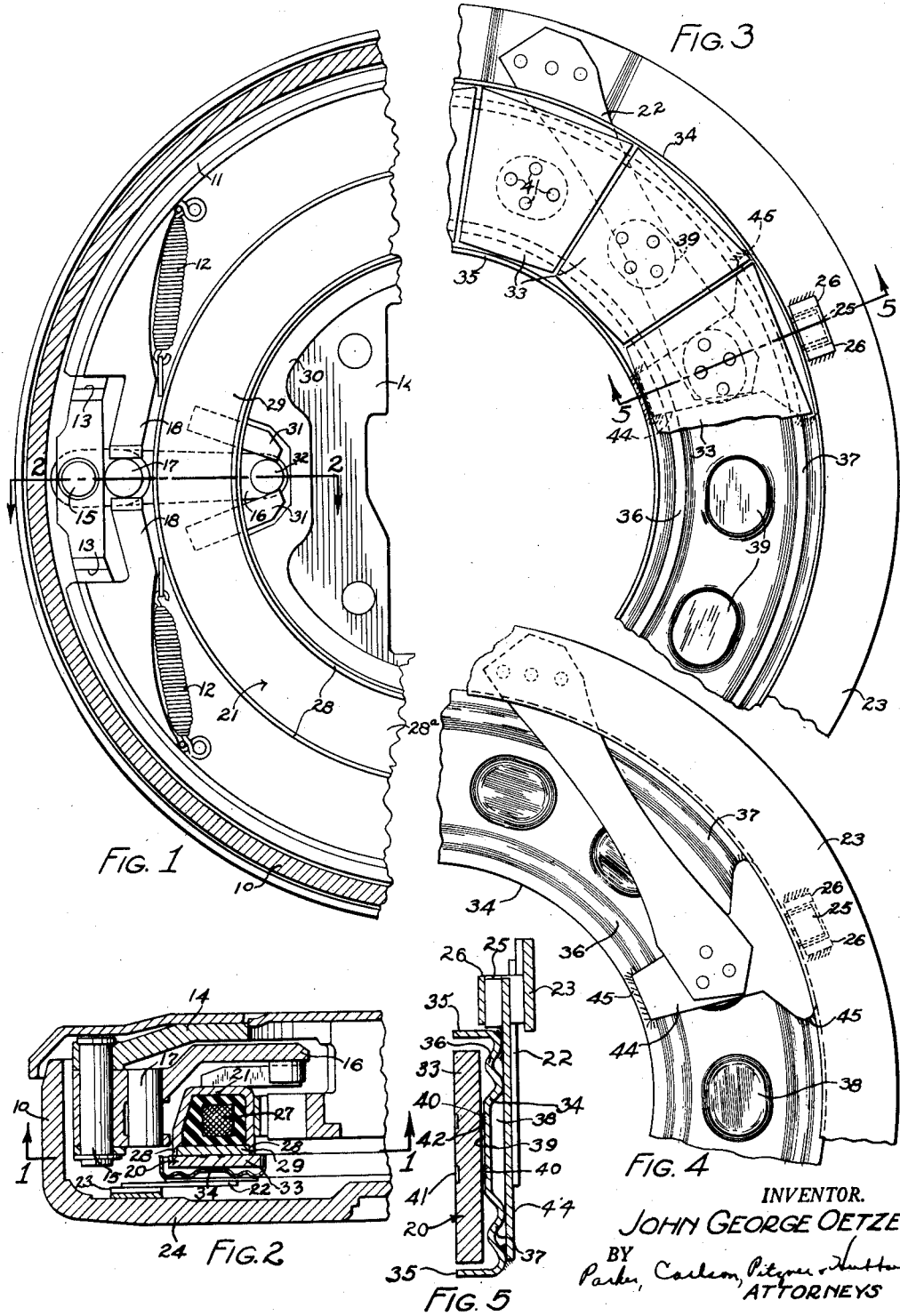
July 11, 1944. J. G. OETZEL 2,353,185
ELECTROMAGNETIC FRICTION DEVICE
Filed Nov. 21, 1941
INVENTOR.
JOHN GEORGE OETZEL Patented July 11, 1944

UNITED STATES PATENT OFFICE 2,353,185

ELECTROMAGNETIC FRICTION DEVICE

John George Oetzel, Beloit, Wis., assignor to Warner Electric Brake Manufacturing Company, South Beloit, Ill., a corporation of Illinois Application November 21, 1941, Serial No. 419,847

11 Claims. (Cl. 188—138)

This invention relates to electromagnetic friction devices for brakes and clutches and more particularly to those in which a frictional force is derived by electromagnetic attraction between a substantially flat annular armature ring and the concentric pole faces of a ring carrying an electromagnetic winding.

One object is to provide, in an electromagnetic friction device of the above character, a novel armature construction which is not subject to distortion by the heat developed during prolonged gripping engagement between the armature and its magnet while the latter is rotating.

The invention also resides in various novel features of the armature construction which facilitates carrying out of the foregoing objects.

Other objects and advantages of the invention will become apparent from the following detailed description taken in connection with the accompanying drawing, in which Figure 1 is a sectional view of an electric brake equipped with a friction device embodying the features of the present invention, the section being along the line 1—1 of Fig. 2.

Fig. 2 is a fragmentary sectional view taken along the line 2—2 of Fig. 1.

Fig. 3 is a fragmentary face view of the armature unit construction in accordance with the present invention.

Fig. 4 is a fragmentary rear view of the armature unit.

Fig. 5 is a section taken along the line 5—5 of Fig. 3.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawing, the invention is embodied, for purposes of illustration, in a brake adapted to be applied to a vehicle and comprising generally a rotatable drum 10 and friction shoes 11 extending around the inner drum surface for expansion into gripping engagement therewith. The shoe ends are disposed adjacent each other and normally drawn by springs 12 against stops 13 rigid with a non-rotatable anchor member 14. Mounted on a pivot 15 on the anchor member between the stops is a crank 16 carrying a stud 17 disposed between the ends of brackets 18 on the shoes and operable upon swinging of the lever in either direction away from the normal brake released position shown to move one shoe end or the other away from its stop and thereby expand the shoes to apply the brake.

The electromagnetic operator in which the present invention is embodied is utilized to spread the ends of the band apart and thereby set the brake. It comprises two rings 20 and 21 of magnetic material arranged concentric with the drum and adapted for axial gripping engagement. The ring 20, which will be described in detail later, constitutes the magnetic armature and is floatingly supported from the drum so as to rotate therewith and at the same time is adapted for some degree of axial movement. To this end, the back of the ring is secured at annularly spaced points to the ends of flexible metal strips 22 which extend tangentially and are spot-welded at their other ends to a ring 23 in turn riveted to the drum flange 24. The strips 22 are tensioned to urge the armature ring 20 away from the drum flange and thereby maintain the face of the ring in constant light mechanical contact with the face of the magnet 21. The strips act in tension to prevent relative rotation between the rings in one direction. Relative rotation in the other direction is prevented by engagement between a lug 25 rigid with the armature ring and lugs 26 rigid with the ring 23.

The ring 21 constitutes a magnetic core and is U-shaped in cross-section with a winding 27 disposed between and enclosed by its two concentric poles 28 and adapted to be energized from a storage battery or other source of electrical power. Plates 28ª of non-magnetic material are mounted between the poles and provide a wear resisting surface substantially flush with the end faces of the poles and adapted to sustain the axial pressure between the two magnetic rings. The magnet ring is supported for oscillation about the drum axis by a circular flange portion 30 of the anchor plate.

Projecting rigidly from the back of the magnet are two actuating lugs 31 having oppositely facing surfaces on opposite sides of a pin 32 on the free end of the crank lever 16. Upon movement of the magnet in either direction away from normal brake released position (Fig. 1), one or the other of the lugs 31 will move its end of the brake away from the stop 13, thereby expanding the band and pressing its entire friction surface against the drum.

Such actuation of the band takes place whenever the winding 27 is energized with the drum rotating. This produces a magnetic flux of high intensity in the closed magnetic circuit which encircles the winding through the opposite sections of the magnet core and armature. The resulting magnetic attraction causes gripping engagement between the friction surfaces of the two magnetic rings proportional to the strength of the energizing current, whereupon the magnet ring will be driven frictionally by the armature ring thereby moving with the drum a short angular distance. In this movement, one end of the band is moved away from the stop 13 expanding the band and thereby pressing the shoes 11 against the drum surface. After the normal clearance has been taken up, angular movement of the magnet ceases, causing slippage between the ring surfaces in the continued rotation of the wheel. When the current flow is interrupted, the springs 12 serve to restore the magnet as well as the actuated end of the band to normal brake released position.

During application of the brake with the vehicle in motion, considerable heat is developed frictionally at the engaging faces. The temperatures attained are proportional to the severity and duration of the brake application. Moreover, the heat distribution between the inner and outer margins of the rings may be different due to inherently uneven pressures at the different poles. The present invention aims to provide a novel construction and mounting of the armature 20 such as to avoid any distortion or warping of the armature face under these variable temperature conditions that may be encountered in severe service use. To this end, the armature is composed of an annular series of relatively short segments 33 correlated in length and width and rigidly connected intermediate their edges to a rigid supporting ring 34 which is adapted to expand and contract edgewise without warping.

To minimize the weight of the armature assembly, the supporting ring is made of relatively thin sheet metal. Rigidity is obtained by forming the ring with inner and outer peripheral flanges 35 between which the segments are disposed and by forming intermediate annular beads 36 and 37 around the ring. Between the beads, the ring is deformed to form circumferentially spaced depressions 38 in the back of the ring and provide flat elevated surfaces 39 to which the individual segments are attached. These depressions are elongated circumferentially as shown to increase the stiffness of the ring.

The segments 33 are attached to the raised ring surfaces 39 by welding preferably at a plurality of points 40 to provide the proper welded area without danger of attaining an excessive temperature during welding. Herein four welds are employed for each segment, two being radially spaced equidistant from the segment center and the other two being spaced equally but slightly farther from the center along the circumferential center line of the armature. Each weld is about midway between the center and the segment edge.

To insure that the segments will be supported at the welds, each segment is depressed as indicated at 41 around the points of welding whereby to form shallow projections 42 on the back of the segment. These projections abut the raised surfaces 39 which, due to the thinness of the ring 34 and the temperature to which they become heated, will yield sufficiently under pressure to permit the faces of all of the segments to be brought into a common plane during spot-welding. In assembly, the segments are supported with their friction faces flat against a rigid surface of perfect flatness. While thus held, the ring 34 is placed against the backs of the segments with the respective raised surfaces 39 opposite the groups of projections 42. Sufficient pressure is applied to the ring 34 during the welding operation to bring all of the projections into contact with the surfaces 39. In this way, the segments and ring form a rigid assembly in which the segment faces are accurately disposed in a common plane despite inaccuracies in the manufacture of the ring 34 or the segments.

The circumferential lengths of the segments 33 are correlated with their radial widths so as to provide for substantial uniformity in the heating of all portions of the segment at the same distance from the segment center. To this end, the length of the segment along the circumferential center line is substantially equal to the radial width of the segment.

With the segments thus mounted on the ring, it will be observed that the heat generated at the segment face will be conducted away rapidly through the welds and dissipated through the supporting ring 34 which provides a comparatively large radiating surface. In spite of its extreme rigidity, this ring is, due to the circumferentially extending beads 36, free to expand and contract edgewise so as not to be susceptible to distortion by the heat thus conducted to it. Owing to its extreme rigidity, the ring holds the segments accurately with their faces in a common plane. It has been found that the gripping face of the armature thus constructed will remain perfectly flat under the widely varying temperature conditions encountered in the service use of the armature in a brake for heavy duty vehicles.

As above set forth, the armature assembly is supported from the drum flange 24 by the longitudinally extending spring arms 22. These are attached to the back of the supporting ring 34 through the medium of plates 44 welded at 45 to the back of the ring and spot-welded to the ends of the spring arm.

I claim as my invention:

1. In an electromagnet friction device, an armature comprising a ring of sheet metal having inner and outer peripheral flanges projecting axially, circumferentially extending ribs formed in said ring, annularly spaced depressions formed in one side of said ring between said ribs and providing raised surfaces on the opposite side, a plurality of pieces of magnetic material arranged end to end around said ring with their faces disposed in a common plane, and means attaching each of said pieces to one of said raised surfaces at a plurality of spaced points spaced from the margins of the piece.

2. In an electromagnetic friction device, an armature comprising a ring of sheet metal having annular reinforcing flanges imparting rigidity to the ring, annularly spaced depressions formed in one side of said ring and providing raised surfaces on the opposite side, a plurality of pieces of magnetic material arranged end to end around said ring with their faces disposed in a common plane, and means attaching each of said pieces to one of said raised surfaces at a point spaced from the margins of the piece.

3. In an electromagnetic friction device, an armature comprising a ring of sheet metal having a peripheral flange imparting rigidity to the ring, a plurality of pieces of magnetic material arranged end to end around said ring along said flange, and means attaching each of said pieces to said ring at a point spaced from the margins of the piece.

4. In an electromagnetic friction device, an armature comprising a ring of sheet metal having circumferentially extending deformations imparting rigidity to the ring while permitting some degree of edgewise thermal expansion and contraction, and a plurality of pieces of magnetic material arranged end to end around said ring and individually attached to the ring intermediate their margins.

5. In an electromagnetic friction device, an armature comprising an annular series of flat pieces of magnetic material arranged end to end with their faces disposed in a common plane, a ring of sheet metal having circumferentially spaced depressions therein spaced according to the spacing of said pieces and imparting rigidity to the ring, and means rigidly attaching each of said pieces to one depressed portion of said ring at a point spaced from the margins of the piece.

6. In an electromagnetic friction device, an armature comprising an annular series of flat pieces of magnetic material each having a plurality of projections on one side thereof, a ring of sheet metal deformed at annularly spaced areas to provide raised surfaces, each abutting against the projections of one of said pieces, and a weld rigidly connecting each of said projections to said ring.

7. In an electromagnetic friction device, an armature ring comprising a ring of sheet metal, an annular series of pieces of magnetic material arranged in end to end relation around said ring, and a plurality of welds rigidly connecting each of said pieces to said ring at a plurality of points spaced apart circumferentially from the center of the piece whereby the welds resist tilting of the piece relative to the ring about a radial axis.

8. In an electromagnetic friction device, an armature comprising an annular series of flat pieces of magnetic material arranged end to end with their faces disposed in a common plane, a ring of sheet metal, and means rigidly attaching each of said pieces to said ring at four points spaced circumferentially and radially apart and from the margins of the piece, said circumferentially spaced points of attachment resisting tilting of the piece about a radial axis through said radially spaced points of attachment.

9. The method of forming an armature of the character described which includes the steps of deforming a sheet metal ring to form flat surfaced projections on one side thereof, deforming each of a plurality of flat magnetic pieces to provide spaced projections on one side of each piece, assembling said ring and said pieces with the projections on the respective pieces abutting one of the projections on said ring, pressing said ring and said pieces together under sufficient pressure to deform said ring and bring the outer surfaces of said pieces into a common plane, and welding the individual projections of said pieces to the projections of said ring.

10. In an electromagnetic friction device, an armature comprising a ring of sheet metal having deformations imparting rigidity to the ring while permitting some degree of edgewise thermal expansion and contraction, and a plurality of pieces of magnetic material arranged end to end around said ring and individually attached to the ring intermediate their margins.

11. In an electromagnetic friction device, an armature comprising a ring of sheet metal having circumferentially extending deformations projecting from one side of the ring near a periphery thereof and imparting rigidity to the ring, and a plurality of pieces of magnetic material arranged end to end around said ring adjacent said deformations and individually secured to the ring intermediate their margins.

JOHN GEORGE OETZEL.